UNITED STATES PATENT OFFICE.

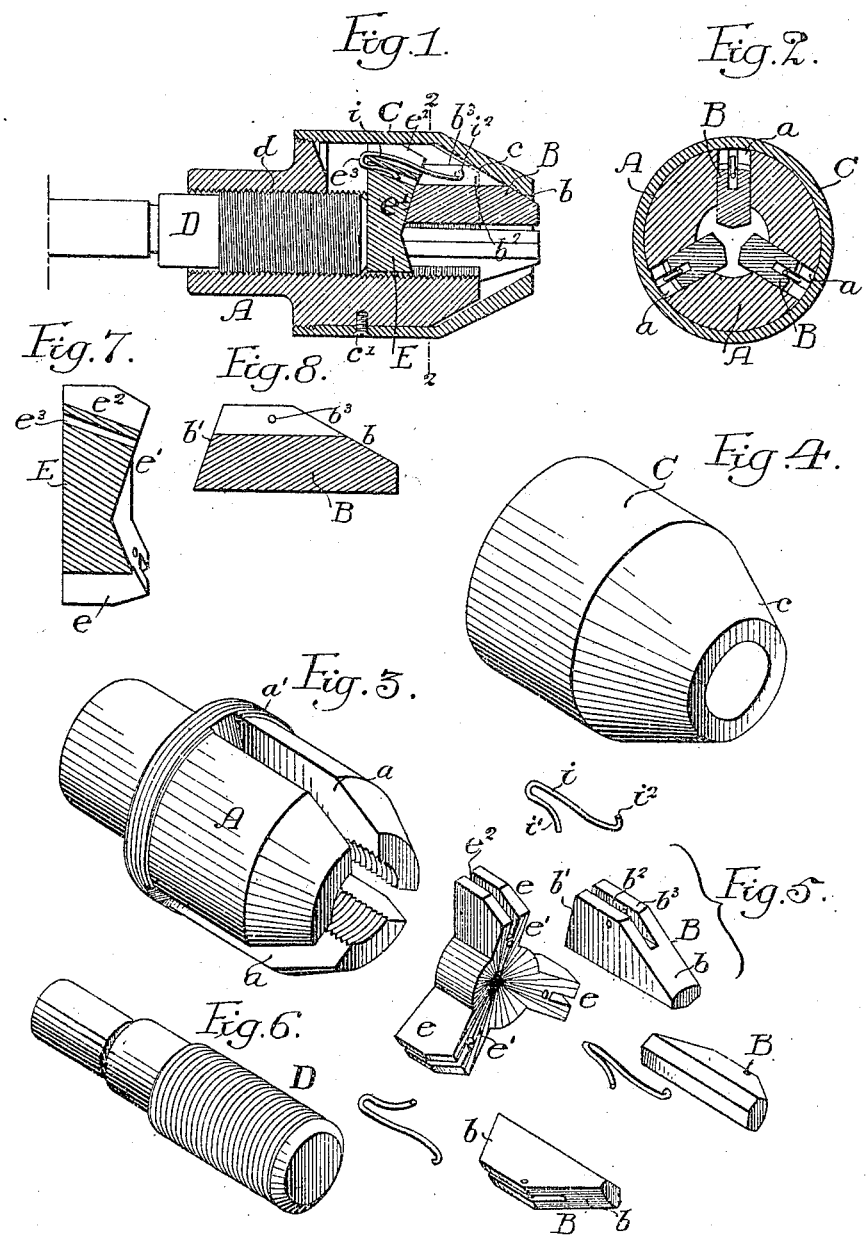

THOMAS J. FEGLEY, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

CHUCK.

948,850.

Specification of Letters Patent.

Patented Feb. 8, 1910.

Application filed April 9, 1908. Serial No. 426,145.

*To all whom it may concern:*

Be it known that I, THOMAS J. FEGLEY, a citizen of the United States, residing in Philadelphia, Pennsylvania, have invented certain Improvements in Chucks, of which the following is a specification.

The object of my invention is to improve the construction of chucks so as to make the chuck simple and effective and to have the jaws move toward or from the center with their faces parallel. This object I attain in the following manner, reference being had to the accompanying drawing, in which:—

Figure 1, is a longitudinal sectional view of my improved chuck; Fig. 2, is a section on the line 2—2, Fig. 1; Fig. 3, is a detached perspective view of the body portion; Fig. 4, is a detached perspective view of the shell; Fig. 5, is a perspective view showing the jaws and their parts detached; Fig. 6, is a perspective view of the spindle; Fig. 7, is a sectional view of the carrier; and Fig. 8, is a sectional view of one of the jaws.

A is the body of the chuck having, in the present instance, three radial slots $a$ for the reception of the jaws B. The body is threaded at the rear end $a'$ and fitting over the body is the shell C having an internal screw thread adapted to the threaded portion $a'$ of the body A. The shell is prevented from turning on the body portion by a screw $c'$. Both the body and the shell are tapered at the outer end, as shown, and each jaw is tapered at $b$ on the same line as the taper $c$ of the shell, so that the jaws will travel forward and back on this surface of the shell. The body portion has a longitudinal opening throughout its entire length and this opening is threaded also throughout its entire length and adapted to the opening is the spindle D; the inner portion $d$ of this spindle being threaded and meshing with the threads of the body portion.

E is a carrier having three arms $e$ which fit in the body portion; the arms projecting into the slots $a$. The end of the spindle D rests against the back of this carrier and the rear portion $b'$ of each jaw B is tapered to fit the tapered face $e'$ of the carrier, so that as the jaws are pushed forward by the spindle D they will slide at one end upon the carrier and at the other end upon the inclined portion of the sleeve. Each arm $e$ of the carrier is slotted at $e^2$ and has a hole $e^3$ for the reception of the spring $i$. The end portion $i'$ of this spring extends into the hole $e^3$ while the hooked portion $i^2$ passes into a slot $b$ in the jaw B and engages a pin $b^3$. This spring is so shaped as to tend to draw the jaw outward, thus holding each jaw firmly against the two inclined bearing surfaces, one on the carrier and the other on the shell.

In assembling the chuck, the jaws are assembled on the carrier and the springs hooked into position and the carrier with its jaws inserted in the body portion, then the sleeve is screwed onto the body portion and secured by a confining screw $c'$.

In operating the chuck all that is necessary is to turn the body portion on the spindle D. By turning it in one direction the carrier will be moved forward, forcing the jaws toward each other, and if there is a shank of a tool in the chuck the jaws will grasp it firmly; and by turning the body portion in the reverse direction the jaws will be moved back from the tool by the springs and can be readily withdrawn from the chuck.

I claim:—

1. The combination in a chuck of a body portion having three radial slots, a sleeve internally tapered at one end and secured to the body portion so as to form an outer jaw bearing, a relatively flat carrier provided with laterally projecting slotted arms extending into the radial slots of the body portion and having a concave face, there being a spring-holding recess in each of the arms, in addition to its slot, a jaw mounted in each slot of the body portion and beveled at each end, one end of each jaw fitting against the tapered face of the carrier and the other fitting against the tapered end of the sleeve, springs respectively mounted in the slots of the carrier arms and acting to force the jaws apart while holding their beveled ends against the carrier and the sleeve, each spring having one end turned over and inserted in the spring holding recess of its arm, with a centrally threaded spindle fitting a threaded opening in the body portion and bearing against the carrier.

2. The combination of a body portion, a shell inclosing the body portion and having a tapered end, radial slots at one end of the body portion and a central opening extending throughout the length of the chuck and connecting with the slots, a carrier having a head portion mounted in the central opening and having arms adapted to the radial slots, each arm being slotted at the outer end and having a hole adjoining the slot, the forward end of the carrier being beveled, jaws adapted to the radial slots, each jaw being beveled at each end, one bevel fitting the bevel of the carrier, the other fitting the conical portion of the shell, the back of each jaw being grooved, a pin extending across the groove, a spring for each jaw, each spring being bent at one end to pass into the hole and rest in the slot, the other end of the spring being hooked to engage the cross bar in the jaw, and a screw threaded spindle adapted to the threaded central opening in the body portion so that on the turning of the spindle in one direction the carrier will be forced forward causing the jaws to move toward the center, and when the spindle is turned in the reverse direction the springs will retract the jaws.

In testimony whereof, I have signed my name to this specification, in the presence of two subscribing witnesses.

THOMAS J. FEGLEY.

Witnesses:
Jos. H. Klein,
Wm. A. Barr.